Feb. 21, 1961     B. VER NOOY     2,972,156
PIPELINE CLEANING DEVICE
Filed Jan. 5, 1959     3 Sheets-Sheet 1

Burton Ver Nooy
INVENTOR.

BY Browning, Simms, Hyer & Eickenroht

ATTORNEYS

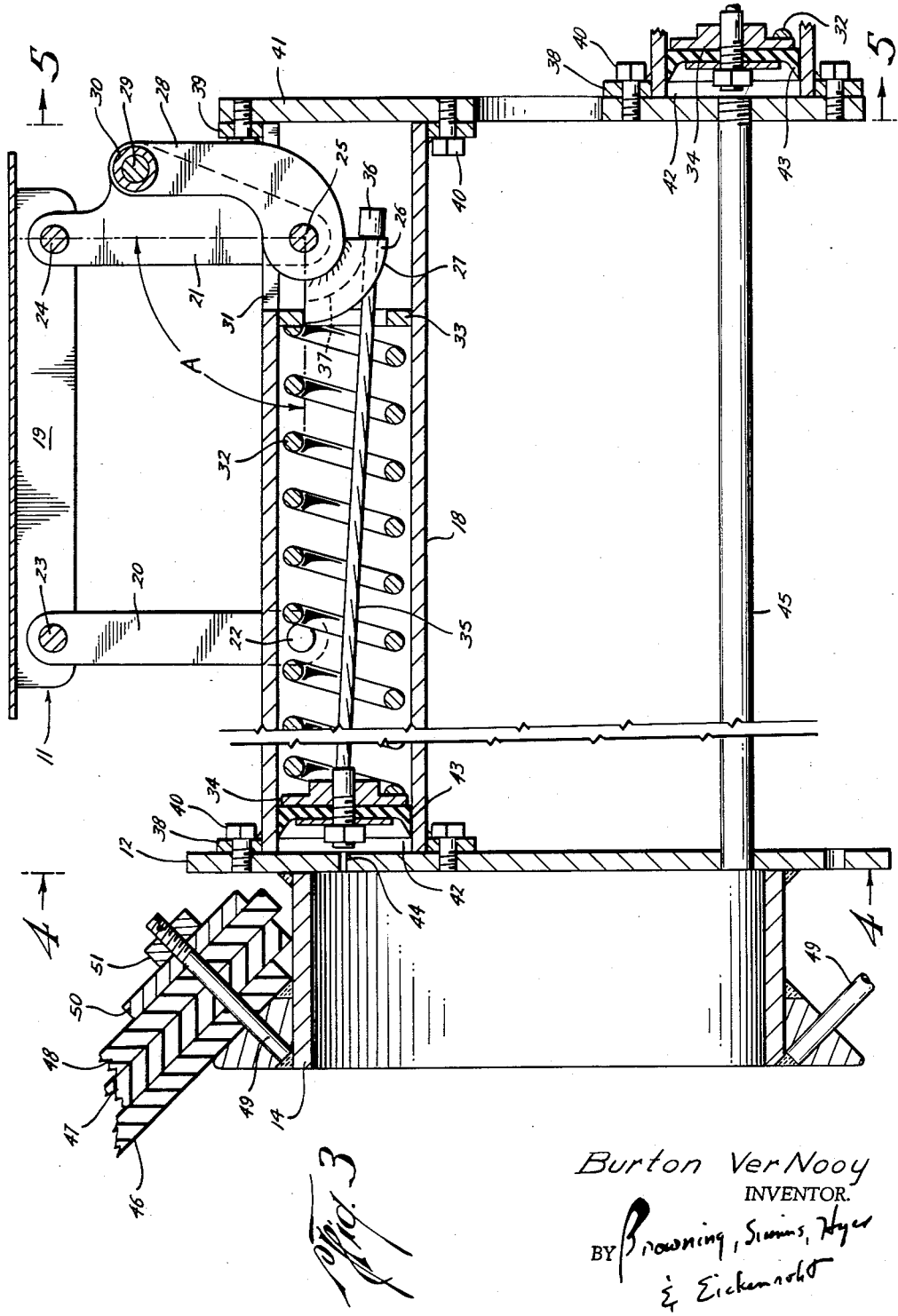

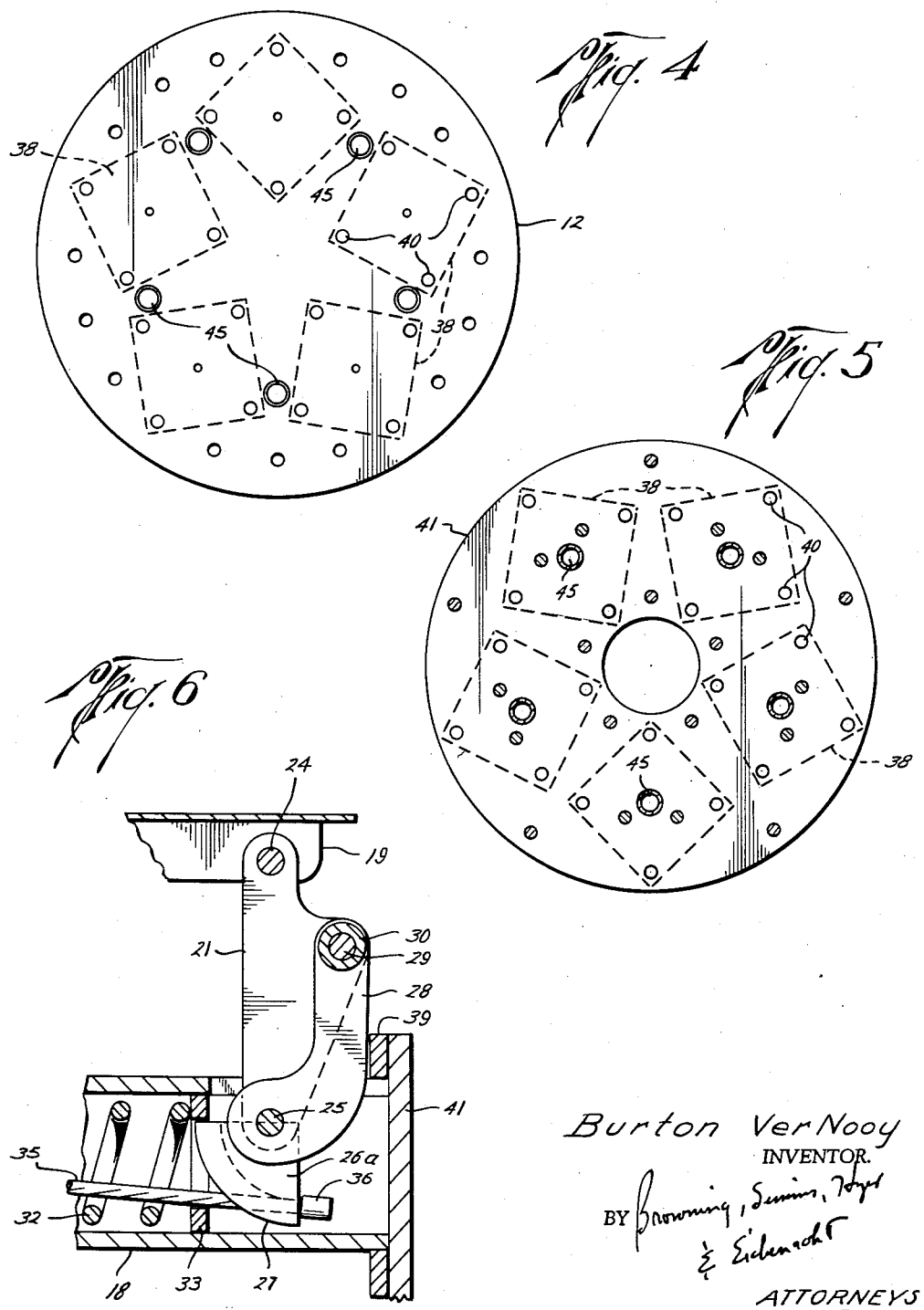

United States Patent Office 2,972,156
Patented Feb. 21, 1961

2,972,156
PIPELINE CLEANING DEVICE
Burton Ver Nooy, Tulsa, Okla., assignor to
T. D. Williamson, Inc., Tulsa, Okla.
Filed Jan. 5, 1959, Ser. No. 784,920
16 Claims. (Cl. 15—104.06)

This invention relates to a pipeline cleaning device of the general class of such devices commonly employed to scrape or otherwise dislodge incrustations or other accumulations from the interior walls of a pipeline. In one of its aspects, the invention relates to a device which is particularly adapted to be used in a pipeline having a relatively large variety of cross-sections. In another and different aspect, the invention relates to a pipeline cleaning device having components which readily lend themselves to construction of such devices in a wide range of sizes without modification of such components merely because of a change in size of the device.

Pipeline cleaners heretofore used commercially have largely consisted of a body on which was mounted a plurality of cleaning elements, the mounting in the main consisting of a leaf spring for each element. Due to the characteristics of the leaf spring, it has been the practice to design a different size of cleaner for substantially every different pipe size. Thus, while the leaf springs which are used to individually mount each of the cleaning elements permit the latter to function effectively through a limited range of variations of pipe cross-sections, they will not effectively accommodate a substantial range of pipe sizes. As the pipe size changes from that for which the cleaner is designed, the leaf springs tend to become unstable, to exert a substantially lesser or greater force on the cleaning elements than that for which they were designed and, in many cases, to change the angular relationship between the working faces of the cleaning elements and the wall of the pipeline.

Pipeline cleaning devices must sometimes accommodate, during a single cleaning operation, a substantial change in pipe size. For example, a 20 inch pipeline may merge with a 24 inch pipeline in a single run and a single cleaner should be able to clean both. Also, restrictions may occur in the pipeline and the device must be able to pass through or by the same. As an example, the pipeline may contain valves which reduce the normal cross-section of the pipeline. Out-of-round and dented in spots may occur in the pipeline. Side openings, such as a T-branch from the pipeline, may be encountered. All of these should be passable by the device with a minimum interruption or decrease in its cleaning efficiency.

In any such device designed to accommodate any or all of the pipeline irregularities which may be encountered, it is necessary to maintain the device properly centered in the pipeline. The device will normally be supported by a combination of the sliding seal means it carries to form a seal with the wall of the pipeline and the reaction of the cleaning elements as they are pressed outwardly against the pipeline wall. Since for best operation, such elements are individually resiliently biased outwardly, provision must be made so that any temporary displacement of one of the elements inwardly or outwardly, as by a dent in the pipeline or by passing a side opening, will not result in the the cleaner moving to and remaining in an off-center position. Continuous movement in such a position would result in undue wear on the seal means and in excessive pressure of the cleaning elements against one side of the pipe and insufficient pressure against the other side.

Further, it is desired that the cleaning elements exert as nearly constant pressure as is possible against the pipe wall despite substantial fluctuations in pipe size or cross-section. In other words, most cleaning elements are most efficient when they are pressed against the pipe wall at a pressure within a given range. Excessive pressure against the pipe wall will result in excessive cleaner element wear and insufficient pressure results in poor cleaning.

It would therefore be desirable to possess a pipeline cleaning device which could accommodate a relatively broad range of pipe sizes and cross-sections without being substantially subject to the disadvantages indicated above. It would also be desirable to possess such a device which could be constructed from a number of common, unitary cleaner sub-assemblies so that by simply choosing the proper number of such sub-assemblies, devices could be constructed for almost all practical sizes of pipeline. This "building block" construction would be more economical and convenient than the conventional use of a different size part for different sizes of cleaning devices.

It is therefore a general object of this invention to provide a pipeline cleaning device, a single size of which can effectively clean pipelines of substantially different diameter or cross-section without the device moving to and then remaining in an off-center position in the pipeline either by virtue of its own weight or by encountering a different size pipe or one having a cross-sectional irregularity.

Another object is to provide such a device in which the cleaning elements can individually move through a substantial radial distance without excessive variation in the pressure they exert on the pipe wall and yet such force increases as the cleaning elements move inwardly toward the body of the device whereby the device is essentially self-centering.

Another object is to provide such a device in which the angular position of the cleaning elements, relative to the pipe wall, does not excessively change despite substantial movement of the cleaning elements inwardly and outwardly to accommodate different sized pipes, etc., and yet the force of the elements on the pipe wall increases as they move inwardly, preferably at a relatively low rate, whereby the device is maintained in a centered position, a desired cleaning pressure is maintained on the pipe wall and the cleaning action remains relatively uniform even though the device encounters restrictions, out-of-round pipe sections, etc. in the pipeline.

Another object is to provide a pipeline cleaning device which has a modular construction so that a number of different sized devices can be built from common sub-assemblies thereby permitting a reduction in manufacturing costs, inventory, etc.

Other objects, advantages and features of the invention will be apparent to one skilled in the art upon consideration of the specification, claims and drawings wherein:

Fig. 3 is a partial cross-sectional view through a portion of the rear section of the device of Fig. 1 to illustrate the construction and mounting of the cleaning subassemblies;

Figs. 4 and 5 are views taken on the lines 4—4 and 5—5, respectively of Fig. 3 to illustrate the relative positioning of the cleaning elements in the rearward and forward sections of the device to obtain substantially full-circle cleaning of the pipe; and Fig. 6 is a view showing a modification of the torque applying means of Fig. 3.

Like characters of reference are used throughout the several views to designate like parts.

Figure 1:
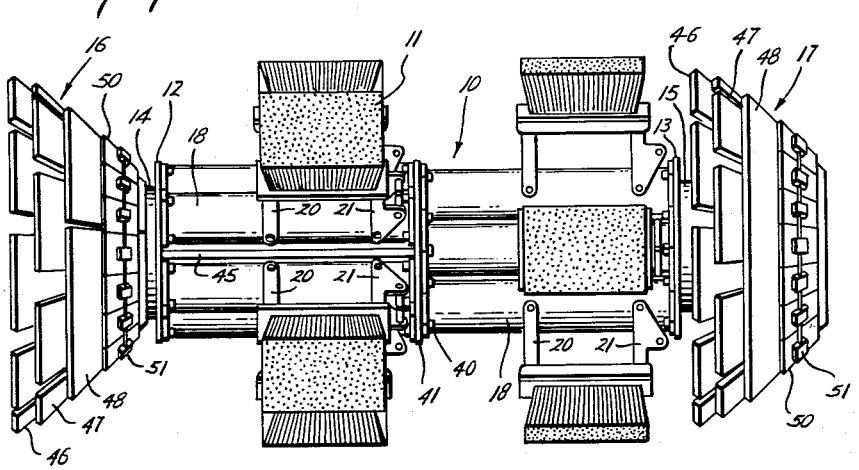
Fig. 1 illustrates a pipeline cleaning device embodying this invention wherein the cleaning elements and seals are shown in fully expanded position as though the device was suspended in mid-air.
Figure 2:
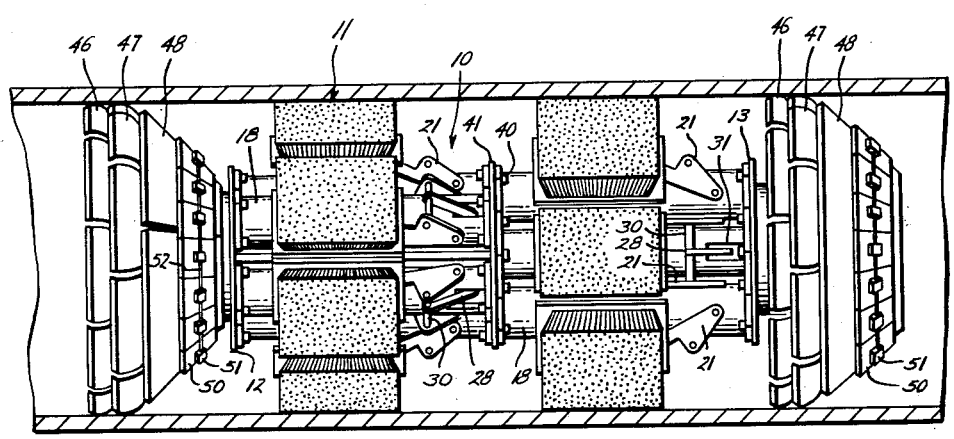
Fig. 2 is a view similar to Fig. 1 except the device is shown in a pipe with the cleaning elements and seals in a compressed position.

Referring generally to Figs. 1 and 2, the illustrated device includes a body portion, designated generally by the numeral 10, upon which are mounted cleaning elements 11 for movement inwardly and outwardly of the body portion as will later be explained. At this time it is to be noted that a portion of the cleaning subassemblies form a part of the body portion as will be made more apparent below. At any rate, the body portion includes end plates 12 and 13 which can have tubular extensions 14 and 15 to support seal means 16 and 17, the latter being adapted to form sliding seals with the pipeline so that fluid flowing in the pipeline can propel the device therealong.

Turning now to a description of a cleaning subassembly as shown in Figs. 1, 2 and 3, each comprises a support 18 which is shown as being tubular. The cleaning element 11 (of which only the brush support 19 is shown in Fig. 3) is pivotally connected to the support by a suitable linkage so that the element can pivot about an axis transverse of the body and move inwardly and outwardly of the support. In the most preferred form, the linkage includes two pairs of arms 20 and 21 with ones of each pair being spaced to either side of the support in order to give lateral stability to the cleaning element in its various positions. Arms 20 are pivotally connected at their inner ends to the support by stub pins 22 extending into journal openings carried by the support. Their outer ends are pivoted to the cleaning element by pins 23. The forward pair of arms 21 are each pivoted at their outer ends, as by pins 24, to the cleaning element while their inner ends are each fixed to a common pivot pin 25 journaled in the support and extending therethrough for connection to the arms 21.

In order that the working face of the cleaning elements can maintain a fixed angular position with respect to the body portion and to the general surface of the pipe to be cleaned, it is preferred that the arms 20, 21, the cleaning element and the support be arranged as a parallelogram and so that the arms can be said to form a parallelogram linkage between the cleaning element and the support. In this manner, the cleaning element in its various lateral positions will always maintain its working face parallel to and in close, full contact with the pipe wall.

Force applying means are provided as a part of the cleaner sub-assembly to apply a force tending to pivot the cleaning element outwardly and away from the body in such a manner that the force required to push the cleaning elements inwardly increases in amount as the cleaning element moves inwardly. This assures that the cleaning device will remain properly centered in the pipe. For example, should the cleaning elements on one side of the device tend to be temporarily moved inwardly more than the elements on the other side, as when the device encounters a dent or flat spot in the pipe, there will be a tendency for the device to move off center. However, since the cleaning elements which are depressed inwardly the most exert a greater reaction on the central body portion than do the other cleaning elements, it is evident that the body portion will be pushed to a position of equilibrium where it is more nearly centered between the various cleaning elements. This attribute is particularly important in preventing localized wear of the seals. For example, should a temporary unequal extension of the cleaning elements occur on the top and bottom of the device and if the force required to push the cleaning elements inwardly decreases as they move inwardly, the elements which are more extended than the others will exert a greater reaction on the body portion than will the opposing but lesser extended elements with the result that the body portion will tend to be pushed still further off-center causing excessive local wear of the seals. Thus such an arrangement is self-aggravating as far as centering of the body portion is concerned, rather than self-compensating as is the device of this invention. This feature gains added significance when it is appreciated that the cleaning elements help support an appreciable part of the weight of the device in order to minimize the weight load on the seals. Without this self-centering feature, the weight of the device would in itself tend to move the device to an off-center position with resultant uneven or increased wear of the seals.

While the force applying means can vary in form, it is essentially a torque applying means here shown as including a member 26 having a curved periphery 27 which periphery can generally curve about the axis of pin 25 in a number of different configurations, but which preferably is arcuate thereabout. The curved member is connected to the pivotal linkage to transmit torque thereto. For ease of assembly, the illustrated connection includes an arm 28 supported at one end on pin 25 and at the other on pin 29, the latter extending to be connected at either end to arms 21 as indicated in Figs. 1 and 2. Suitable spacers 30 can be disposed on pin 29 to either side of arm 28 to maintain the latter centered between the arms. At any rate, arm 28 can extend through slot 31 in the support to its connection with pin 25 and the curved member can be connected to arm 28 as by welding.

The torque applying means also includes a resilient member, such as spring 32 which is here shown in the tubular support with its forward end abutting an end support 33 fixed to the tubular support. The other or movable end of the spring has a connector 34 to which is attached one end of a flexible means, such as cable 35. The other end of the cable is connected to the curved member as by a cable head 36 abutting one side of the member with the cable lying in a peripheral guide groove 37 in the curved member.

With this arrangement, it will be seen that the spring and its connection to the cleaning element cause a torque to be applied tending to move the cleaning element outwardly. In order to cause the radial force exerted by the cleaning element against the pipe wall to increase as the element is moved inwardly, the torque applied is caused to increase at a rate greater than the rate at which the secant of the angle A decreases over the desired range of movement of the cleaning element. Thus with the cleaning element in the fully extended (A equals 90°) position of Fig. 3, theoretically the radial force the cleaning element could exert against the pipe wall would be infinite. As the cleaning element is moved inwardly, and assuming a constant torque is applied about pin 25 by the force applying means, the force the cleaning element exerts against the pipe wall will decrease at a rate which is a function of the secant of angle A as it changes between its different values. By selecting spring 32 to have a loading rate such that the torque applied about pin 25 increases at a rate faster than the secant of angle A decreases, the cleaning element force against the pipe can be made to increase as the element is moved inwardly. Also, the cam arrangement of Fig. 6 wherein member 26a is formed so that the moment arm it provides for cable 35 changes as the cleaning element is retracted, can also be used to regulate the torque applied. However, it will usually be desired to use the arcuate "cam" or member 26 since it is more economical and since it affords, with typical springs, a more desired rate of increase in torque.

In conjunction with the rate of increase in torque applied as the cleaning element is retracted, it is usually preferred that this rate be such that the change in force which the cleaning element applies to the pipe wall is small relative to the total force applied. For example, the element may exert about 90 pounds of radial force when positioned about midway between its two extreme positions. Assuming the arms 20 and 21 are 5″ long in effective length, the spring can be then sized and adjusted so that the radial force of the cleaning element will vary only about 10 pounds as the cleaning element moves through the central three inch portion of its total five inches of permissible radial movement.

The amount of change in force the cleaning elements apply to the pipe wall through their range of movement is determined by the number of factors. For example, the amount of change will be greater with the arcuate member 26 than with the cam member 26a, other factors being equal. On the other hand, member 26a can be positioned so that the moment arm it provides for the spring and cable will increase as the cleaning element is retracted. The amount of preloading of the spring is another factor. Thus, a spring which is not preloaded will result in a larger amount of change than will a spring that is preloaded (i.e. a spring which exerts a force when in the Fig. 3 position) even though the net changes in force exerted by the non-preloaded and the preloaded springs, when compressed the same amount, are equal to each other. Thus, preloading will decrease the rate of change of the radial force the cleaning element exerts as it moves outwardly or inwardly. However, excessive preloading can have an adverse effect. Thus, as the angle A is decreased from 90° to some lesser value, the cleaning element force first rapidly decreases to a minimum and then gradually increases. As preloading increases, the minimum value of the cleaning element force occurs at a lesser and lesser value of angle A. If the minimum value of the cleaning element force occurs within the operating range of the cleaning element movement, then a portion of such range will entail decreasing force being exerted by the cleaning element against the pipe wall as the element moves inwardly. Thus, for the larger sizes of pipe for which the cleaning device was designed, there will be a tendency for the device to be urged off-center by the cleaning elements while for smaller sizes, the self-centering characteristics will be present. Accordingly, for any given range of cleaning element movement, there will be an optimum spring preloading to yield the most nearly constant cleaning element force and yet one which increases as the elements are moved inwardly.

As indicated above, one aspect of this invention relates to the provision of cleaner sub-assemblies in such a manner that modular construction of the cleaning device is possible. Thus, in the illustrated device, the supports 18 are provided at their ends with connecting means for connecting them to a spacer. The connecting means can take the form of flanges 38 and 39 at the rear and forward ends of the supports. These can be fastened, as by bolts 40, to the rear spacer 12 and center spacer 41 for the rearward cleaner sub-assemblies, and to the central spacer 41 and the forward spacer 13 for the forward cleaner assemblies. In this manner, a part of the cleaner sub-assemblies forms a part of the body portion together with the spacers which are here shown as circular plates. By arranging the rear group of cleaner sub-assemblies about the axis of the device as indicated in Fig. 4 and the forward group as shown in Fig. 5, full-circle coverage of the pipe wall can be obtained.

When it is desired to construct a larger cleaning device, larger diameter spacers are used and the number of cleaner sub-assemblies in each group is increased accordingly without changing the size or design of the sub-assemblies. Thus, these sub-assemblies of a given size can be used to build a range of sizes of cleaning devices thereby decreasing manufacturing costs, inventory, etc.

As shown in Fig. 3, the movable end of the spring 32 can be provided with means for forming a sliding seal across the support. There results a chamber 42 whose volume varies with this position of the movable end of the spring. Means are provided for controlling flow into and out of this chamber in such a manner that as the cleaning element moves inwardly, flow into the chamber can be more rapid than flow therefrom can be when the cleaning element moves outwardly. This prevents the cleaning elements from jumping out into side-openings, etc. where they could be damaged and yet permits their rapid inward movement to accommodate restrictions in the pipeline. Such flow control means are shown to comprise a lip type seal 43 and a restricted port 44. When the spring is compressed, fluid can by-pass the lip type seal relatively rapidly and flow into chamber 42. However, upon contraction of the chamber, the seal prevents fluid by-pass and all fluid must flow out restricted port 44. In order to communicate the chambers of the forward group of cleaner sub-assemblies with the rear of the cleaning device, tubes or pipes 45 can connect between the rear and center spacer plates to provide such communication. This permits any sizeable increase in fluid pressure to the rear of the cleaning device, as will occur should the device be substantially slowed down or stopped by a restriction in the pipe, to apply force to tend to retract the cleaning elements thereby aiding passage of the device through the restriction.

While the seal means can take a number of forms, they should have sufficient diametrical flexibility to affect a seal with the pipeline over the range in cross-sections which can be accommodated by the cleaning elements. For example, the seal means can comprise a plurality of resilient (e.g. rubber) flaps 46 and 47 arranged respectively in circumferential rows with the flaps alternately overlapping each other. Semi-circumferential flaps 48 can be provided as back-ups for the flaps 46 and 47 to aid in preventing fluid pressure from folding the narrower flaps forward thereby reducing their sealing power. The various flaps can be held in place by bolts 49, metal plates 50 and nuts 51. A wire 52 can be passed through a hole in each bolt to prevent nuts 51 from unscrewing.

It will be noted that all of the cleaning assemblies can be constructed similarly to the one shown in Fig. 3. Also, the forward spacer plate can be imperforate similar to plate 12 as shown in Fig. 3. The cleaning devices have been shown as brushes but other types can be employed, such as toothed rollers, solid plow-like scrapers, etc.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present application claims common subject matter shown but not claimed in copending application Serial No. 395,363, filed December 1, 1953, now Patent Number 2,932,837.

The invention having been described, what is claimed is:

1. A pipeline cleaning device comprising in combination an elongate body portion adapted to be disposed in a pipeline and including sealing means adapted to form a sliding seal with the pipeline so that the body portion can be propelled through the pipeline by fluid flowing therethrough; and a plurality of cleaning assemblies carried by the body portion to clean a substantial portion of the inner periphery of the pipeline; each of the assemblies including a cleaning element, a linkage pivotally connected to the body portion and to the cleaning element so that the cleaning element can move inwardly and outwardly of the body portion while maintaining the cleaning element in substantially constant angular relation with the body portion, and independent spring actuated means for extending the linkage outward to bring the cleaning element into contact with the pipeline, the spring actuated means decreasing the outward force applied to the cleaning element as the cleaning element moves outward.

2. The device of claim 1 wherein the spring actuated means for extending the linkage outward comprises a rotatable member disposed to urge the linkage outward, a spring connected at one end to the body and having a connector at its other end, and means connecting the connector to the rotatable member so that the spring applies torque thereto to urge the cleaning element outward.

3. The device of claim 2 wherein the means for extending the linkage outward includes a member connected to the rotatable member and having a periphery curved about said rotatable member, elongate flexible means connected to the curved member to wind upon the curved periphery thereof as the cleaning element is moved inward toward the body, and a spring connected to the flexible means to tension the same and thereby apply torque to the rotatable member.

4. The device of claim 3 wherein said curved periphery is arcuate about the axis of the rotatable member.

5. The device of claim 3 wherein said curved periphery is spirally arranged about the axis of the rotatable member.

6. The device of claim 1 wherein the linkage comprises a pair of arms each pivotally connected to the body portion and to the cleaning element.

7. The device of claim 1 wherein the spring is preloaded so that it exerts a force when the cleaning element is in fully extended position.

8. A pipeline cleaning device comprising, in combination, a body portion adapted to be disposed in a pipeline and including seal means adapted to form a sliding seal with the pipeline so that the body portion can be propelled through the pipeline by fluid flowing therethrough; and a plurality of cleaning assemblies carried by the body portion to clean a substantial portion of the inner periphery of the pipeline; each of the assemblies including a cleaning element, a pair of arms each pivotally connected to the body portion and to the cleaning element to form a parallelogram linkage therewith so that the cleaning element can move inwardly and outwardly of the body portion while maintaining a substantially constant angular relation with the body portion, a member connected to the parallelogram linkage and having a curved periphery disposed to rotate about the axis of one of the pivotal connections between the linkage and body portion, a flexible cable connected to the curved member so as to wind upon said curved periphery as the cleaning element moves inwardly, and a spring connected to the cable to apply force thereto, the arrangement being such that the torque applied to the parallelogram linkage increases as the cleaning element moves inwardly.

9. The device of claim 8 wherein the spring has characteristics and the curved member is such that the torque applied thereby increases, with inward movement of the cleaning element, at a rate at least as great as the rate of decrease of the secant of the angle between one of said arms and the body portion.

10. The device of claim 9 wherein the spring is preloaded so that it applies force to the curved member when the cleaning element is in fully extended position.

11. The device of claim 10 wherein the pre-loading of the spring is such that the rate of increase in force required to move the cleaning element inwardly is small relative to the total required force whereby the force of the cleaning element against the pipe line varies only a small amount despite substantial changes in pipeline diameter.

12. A pipeline cleaning device which comprises, in combination: a body portion comprising a plurality of individual cleaning assemblies arranged about the longitudinal axis of the body portion, each of the assemblies comprising an elongate support having connecting means at each end, a cleaning element, and means comprising spring actuated pivoted parallel links connected between the support and cleaning element for resiliently urging the cleaning element outwardly; spacer means connected to the connecting means at each end of the cleaning assemblies and spacing the latter so that the cleaning elements thereof are disposed about the wall of the pipeline, and seal means carried by the spacer means for forming a sliding seal with the pipeline.

13. The device of claim 12 wherein the spacer means are plates respectively connected to the rear and forward ends of the supports, at least one of the plates carrying a peripheral seal so that said one plate and said peripheral seal form at least a part of said seal means.

14. The device of claim 13 wherein said supports are tubular and wherein said means resiliently urging the respective cleaning elements outwardly each include a pair of arms each pivoted to the support and to the cleaning element, a member having a curved periphery connected to at least one arm so that said periphery is curved about the axis of the pivotal connection of the arm with the body, a flexible member connected to the curved member to wind upon said curved periphery as the cleaning element moves inwardly, and a spring in said tubular support and connected to said flexible member to apply torque to urge the cleaning element outwardly.

15. The device of claim 14 wherein a piston is disposed for reciprocation in the tubular support and is connected to the spring for movement therewith, and a restricted passageway between the tubular support and to the exterior of the cleaning device at the rear thereof, the arrangement being such that the pressure of fluid at the rear of the device acts on the piston to apply force to decrease the torque applied by the spring.

16. A pipeline cleaning device comprising, a body portion adapted to be disposed in and moved longitudinally of said pipeline, cleaning elements carried by said body portion for relative movement with respect thereto, means for urging said cleaning elements away from said body portion and into engagement with said pipeline, and means associated with said urging means providing relatively rapid movement of said cleaning elements toward said body portion during passage of said device into reduced portions of said pipeline and relatively less rapid movement thereof away from said body portion during passage of said device into enlarged portions of said pipeline.

References Cited in the file of this patent

UNITED STATES PATENTS

| 1,631,562 | Thompson et al. | June 7, 1927 |
| 1,696,677 | Hayton | Dec. 25, 1928 |
| 2,178,122 | Ostler et al. | Oct. 31, 1939 |
| 2,552,339 | Moon | May 8, 1951 |
| 2,812,624 | Billeter | Nov. 12, 1957 |

FOREIGN PATENTS

| 26,479 | Great Britain | of 1908 |
| 160,465 | Australia | July 8, 1954 |
| 750,592 | Great Britain | June 20, 1956 |